(12) United States Patent
Baumgartner

(10) Patent No.: US 7,212,589 B2
(45) Date of Patent: May 1, 2007

(54) SPEED NEGOTIATION FOR SERIAL TRANSCEIVERS

(75) Inventor: Steven John Baumgartner, Zumbro Falls, MN (US)

(73) Assignee: International Business Machines Corporation, Armonk, NY (US)

( * ) Notice: Subject to any disclaimer, the term of this patent is extended or adjusted under 35 U.S.C. 154(b) by 777 days.

(21) Appl. No.: 10/631,922

(22) Filed: Jul. 31, 2003

(65) Prior Publication Data
US 2004/0022306 A1    Feb. 5, 2004

(51) Int. Cl.
*H04L 27/00*    (2006.01)
*H04B 10/06*    (2006.01)

(52) U.S. Cl. ...................... 375/325; 398/202
(58) Field of Classification Search ............... 375/325, 375/316, 320, 345, 354; 398/154–155, 202–214, 398/162–163
See application file for complete search history.

(56) References Cited

U.S. PATENT DOCUMENTS

| 5,008,902 | A | | 4/1991 | Key et al. |
| 5,400,167 | A | * | 3/1995 | Suemura ..................... 398/209 |
| 5,548,434 | A | * | 8/1996 | Shimonaka et al. ......... 398/162 |
| 5,898,719 | A | * | 4/1999 | Ryu .............................. 372/32 |
| 5,901,191 | A | | 5/1999 | Ohno |
| 5,982,837 | A | | 11/1999 | Earnest |
| 6,072,827 | A | | 6/2000 | Krulce |

* cited by examiner

*Primary Examiner*—Khai Tran
(74) *Attorney, Agent, or Firm*—Matthew C. Zehrer

(57) ABSTRACT

An arrangement to enable automatic baud rate speed negotiation between transceivers having different operating speed characteristics is implemented. When an event indicative of a possible baud rate mismatch occurs, control signals are generated and used to trigger a baud rate negotiation procedure. In the baud rate negotiation procedure, a predetermined pattern is transmitted, the baud rate of the respective transmitting transceiver is decoded, and the decoded baud rate is used to select an appropriate filtering for the transceiver.

6 Claims, 8 Drawing Sheets

SPEED NEGOTIATION FOR SERIAL TRANSCEIVERS

CROSS RELATED APPLICATION

This application is related to patent application Ser. No. 09/614,515 filed Jul. 12, 2000 now U.S. Pat. No. 6,771,694, which is hereby incorporated by reference.

BACKGROUND OF THE INVENTION

1. Field of the Invention

The invention relates to the field of serial transceivers, and in particular, to speed negotiation between transceivers having different characteristics.

2. Background Information

A number of different speeds and standards are currently used and being developed in serial communications systems, for example, fiber optical communication links. Serializer/Deserializer (SerDes) modules are used in digital communications system transceivers to serialize and Deserializer data which is sent in serial form over a communications medium.

Existing transceivers, also called legacy transceivers, have generally been designed to operate at a different and lower speed than the newly emerging transceivers. It is desirable to be able to continue to use the legacy transceivers in existing systems, but also be able to connect them with other systems having the faster emerging transceivers. A user may want to upgrade a system to the faster transceivers in stages, and therefore it would be desirable to be able to continue using the legacy transceivers while upgrading.

However, currently, problems may be encountered in a link having two or more transceivers designed for different operating speed standards. Generally, a link having transceivers with different operating speeds can operate consistently only at the speed of the lowest speed transceiver. Therefore, the higher speed devices need to be able to operate at the lower speed.

Further, it would be advantageous if each transceiver could automatically detect the respective speeds of the other transceiver to which it is connected in a point-to-point link, automatically determine when a speed adjustment is necessary, and automatically make the speed adjustment.

One proposal which was discussed at a meeting of the Fiber Channel Optical Working Group in the Fall of 1999, was to encode and detect different baud rates using a lights on, lights off sequence, the rate of 'flashing' being related to the baud rate. For example, a 1 Hz flashing rate would mean a 1 GHz baud rate. However, so far no standard has been adopted in this regard.

Therefore, a need exists for an arrangement to implement an automatic baud rate negotiation between transceivers having different baud rate operating characteristics.

Along with automatic baud rate detection and adjustment, there is also a need to select and adjust to the appropriate speed-dependent (baud rate dependent) filtering because different link baud rate/speed standards require different transceiver bandwidths. Solutions to the bandwidth adjustment problem are described in copending application attorney docket, application Ser. No. 09/574,239, filed May 19, 2000, entitled "SWITCHABLE-BANDWIDTH OPTICAL RECEIVER" and assigned to the same assignee as the present application. A number of different ways in which receiver bandwidth can be adjusted are disclosed therein.

Known Fiber Channel standard optical transceivers have control input/output signals (I/O's) known as Transmit Disable (TxDsbl) and Receive Loss of Signal (RxLOS). These signals are presently used to disable a transmission and indicate the loss of a received signal, respectively. These signals may be used diagnostically to detect and/or indicate problems in a communications link, or for power conservation reasons, for example.

SUMMARY OF THE INVENTION

It is, therefore, a principle object of this invention to provide a method and apparatus for speed (baud rate) negotiation for serial transceivers.

It is another object of the invention to provide a method and apparatus that solves the above mentioned problems so that existing serial transceivers can continue to be used with emerging transceivers having different operating characteristics.

These and other objects of the present invention are accomplished by the method and apparatus disclosed herein.

According to an aspect of the invention, an arrangement to enable speed (baud rate) negotiation between transceivers having different operating speed characteristics is implemented using existing optical transceiver control input/output signals. In particular, Fiber Channel Transmit Disable (TxDsbl) and Receive Loss of Signal (RxLOS), together with serial data input into the transceiver from Serializer/Deserializer (SerDes) modules, are used to create an event which will allow the transceiver to detect the baud rate of the signal that the SerDes is transmitting, for example.

According to another aspect of the invention, when an RxLOS is detected on either end of the link, one of the possibilities is that a new port has been plugged in and the data transmitted from that port might not be speed-compatible with the receiver. If any event that might cause a change in port speed occurs, e.g., fiber swapping, transceiver swapping, electrical switching of serial streams, the TxDsbl input can be cycled on and off for a long enough period of time to induce a RxLOS on the receiving end.

According to another aspect of the invention, RxLOS on the receiving end can also trigger the same cycling of TxDsbl on that end so that both ends of the point-to-point link receive a RxLOS.

According to another aspect of the invention, TxDsbl can be followed by the lowest frequency clock like data pattern that is desired to be transmitted by the transceivers. This way, the transceivers can default to their lowest bandwidth filtering and still be able to decipher the pattern.

According to another aspect of the invention, in Fiber Channel, a K28.7 code, or binary 10 bit equivalent (0011111000), is preferred.

According to another aspect of the invention, if the K28.7 pattern is used, this algorithm can be extended across a 5× change in baud rate since the lowest bandwidth receiver can still decipher the 0011111000 pattern if multiplied up by 5 to a 0101010101.

According to another aspect of the invention, the sending of the K28.7 pattern is multiplexed with data into the Serializer/Deserializer (Ser/Des) Transceiver, selected by a logical processing of the RxLOS signal. This logical process will work with duplex or simplex cabling and tolerate a single lane being disconnected at a time.

According to another aspect of the invention, after the transceiver detects that a signal is present, it will start discriminating the baud rate.

According to another aspect of the invention, frequency discrimination is done in the transceiver using a reference oscillator signal and a simple up counter which counts the number of transitions in a given oscillator period to decode the baud rate.

According to another aspect of the invention, the number of bits required in the up counter is proportional to the number of transitions per oscillator period.

According to another aspect of the invention, with respect to the Fiber Channel standard, the invention can be implemented in the physical layer with some buffering logic to control the RxLOS and TxDsbl.

According to another aspect of the invention, the problem of selecting the appropriate baud rate dependent filtering is solved by using a specific training pattern during events that could cause transceiver modules of different speed characteristics to be connected. Advantageously, this means that there is no additional pin required from an existing form factor device to signal the filtering bandwidth required for operation. The detection of the baud rate is done on the transceiver itself.

These and other aspects of the invention will become apparent from the detailed description set forth below.

DETAILED DESCRIPTION OF THE PREFERRED EMBODIMENT(S)

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

In the following description, an exemplary method and apparatus for speed (baud rate) negotiation for serial transceivers is explained. The exemplary method and apparatus solves the problems referred to above so that existing serial transceivers can continue to be used with emerging transceivers having different operating characteristics. An arrangement to enable speed (baud rate) negotiation between transceivers having different operating speed characteristics will now be described, implemented using existing optical transceiver control input/output signals. In particular, Fiber Channel Transmit Disable (TxDsbl) and Receive Loss of Signal (RxLOS), together with serial data input into the transceiver from Serializer/Deserializer (SerDes) modules, are used in the exemplary embodiment to create an event which will allow the transceiver to detect the baud rate of the signal that the SerDes is transmitting, for example.

Figure 1A:
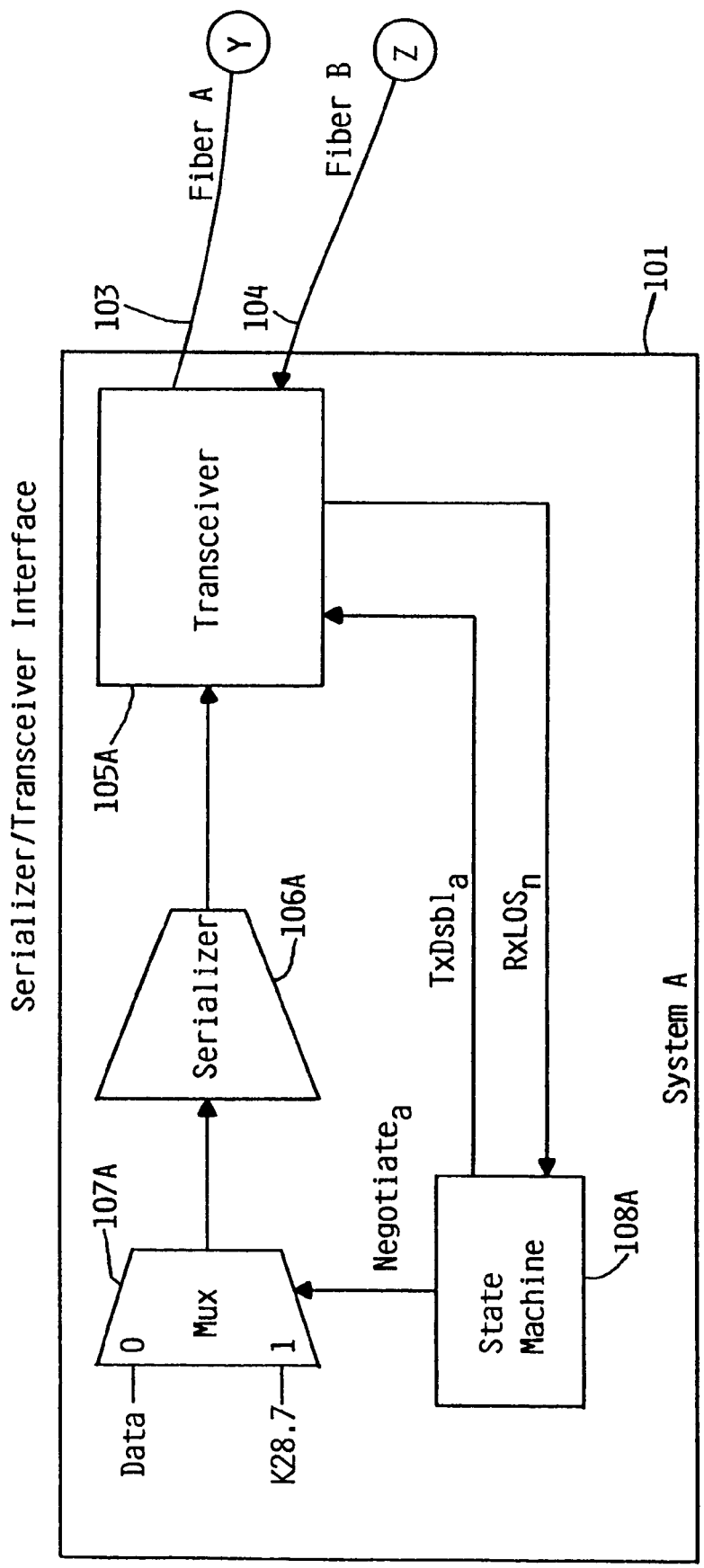
FIG. 1 illustrates a block diagram of a serializer/transceiver interface according to an exemplary embodiment of the invention.
Figure 1B:
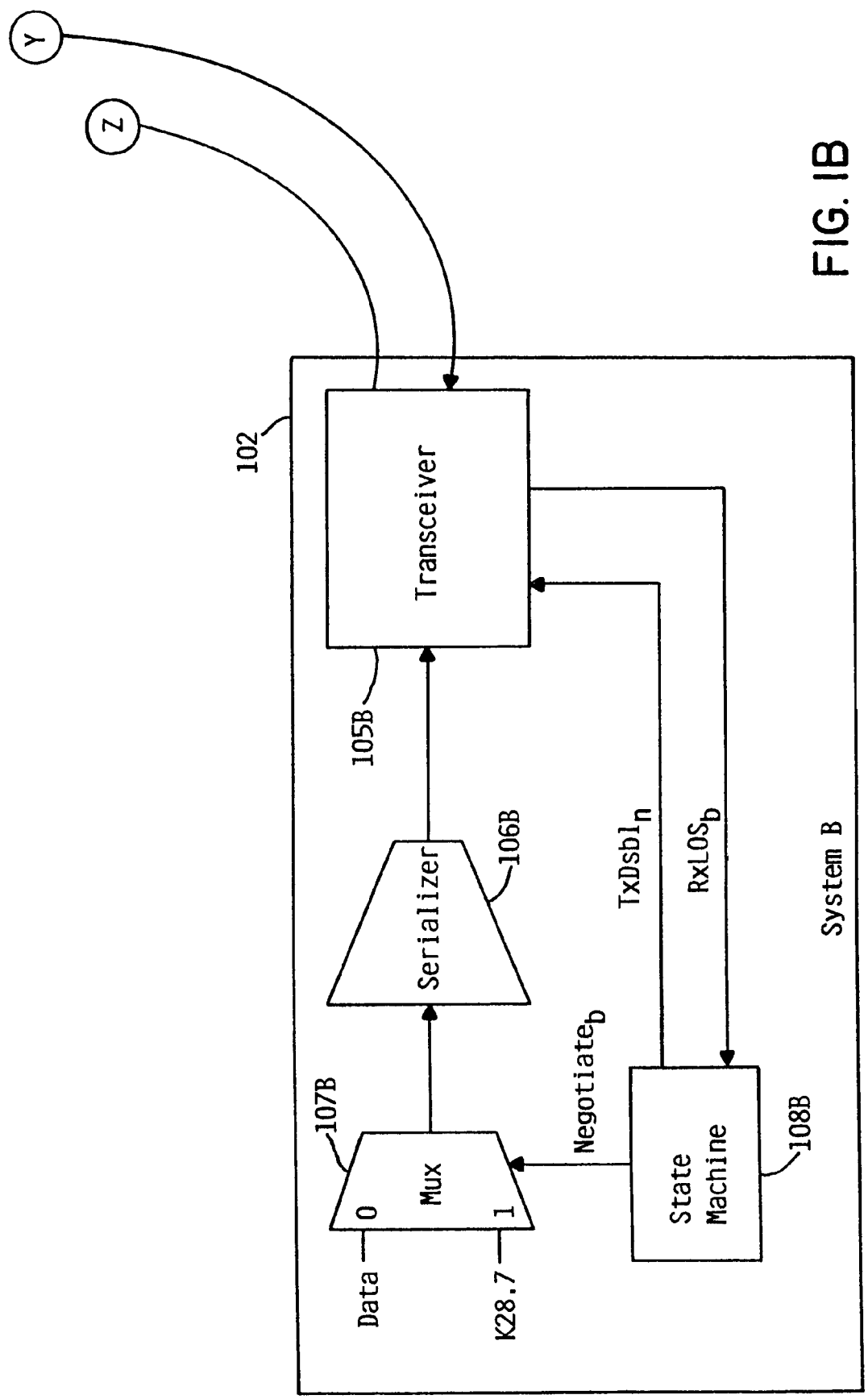

FIG. 1 is a block diagram of a Serializer/Transceiver Interface according to an exemplary embodiment of the invention. System A 101 and System B 102 are shown interconnected by two fibers Fiber A 103 and Fiber B 104. Although the invention is described as implemented in a duplex link, the systems could be interconnected by more than two fibers, as would be apparent to one skilled in the art.

Each system has a number of functional components which are illustrated in block diagram form in FIG. 1. The components of System A 101 will be given the suffix 'A' and components of System B 102 the suffix 'B' for easy reference. System A 101 has a Transceiver 105A, which is fed signals from a Serializer 106A. The Serializer 106A receives signals from a multiplexer (Mux) 107A, which multiplexes Data and K28.7 signals. Finally, System A 101 has a State Machine 108A which receives a signal (RxLOSa) from the Transceiver 105A and produces respective signals (TxDsbl-a and Negotiate-a) for the Transceiver 105A and the Mux 107A. System B 102 has the same configuration as System A and therefore need not be described in detail.

Therefore, the sending of the K28.7 pattern is multiplexed with data into the Serializer/Deserializer (Ser/Des) Transceiver, selected by a logical processing of the RxLOS signal. This logical process will work with duplex or simplex cabling and tolerate a single lane being disconnected at a time. After the transceiver detects that a signal is present, it will start discriminating the baud rate. Frequency discrimination can be done in the transceiver using a reference oscillator signal and a simple up counter which counts the number of transitions in a given oscillator period to decode the baud rate.

Figure 2A:
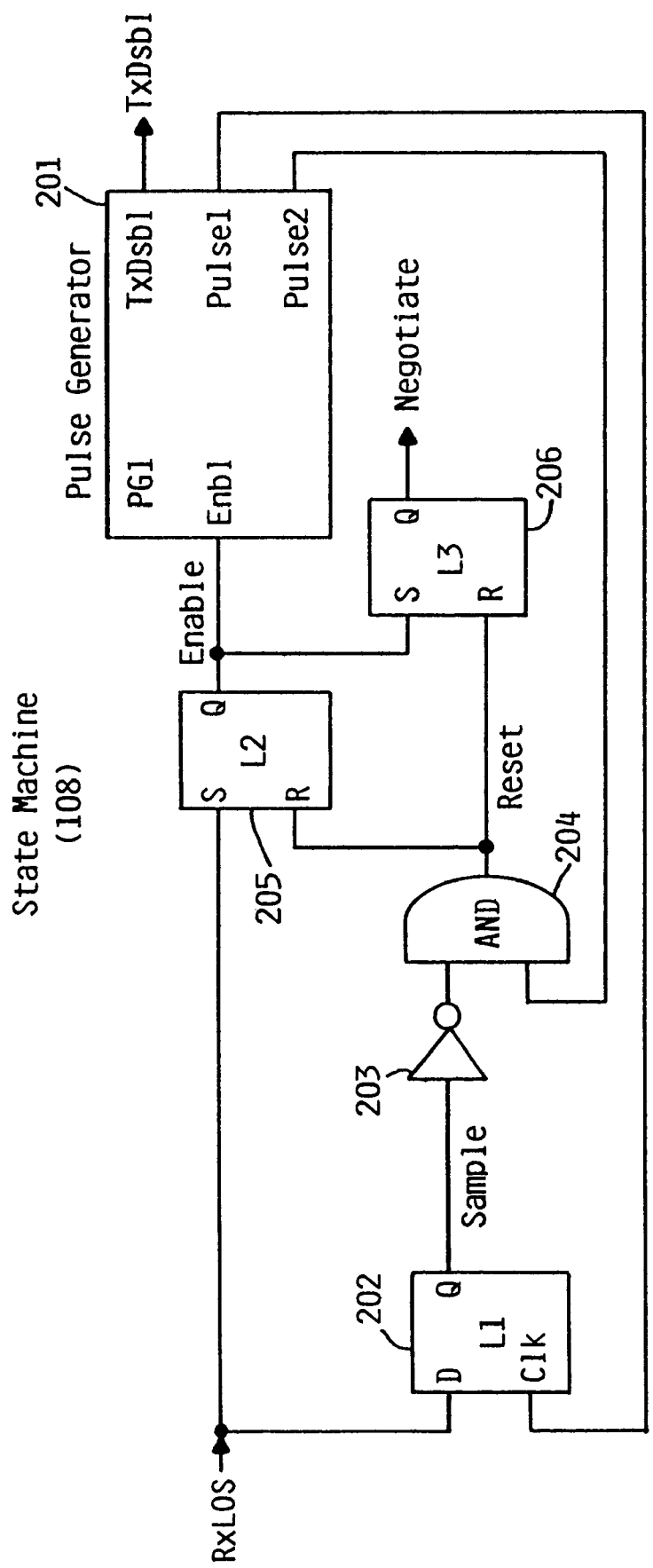
FIG. 2A illustrates a block diagram of the state machine of FIG. 1, according to an exemplary embodiment of the invention.
Figure 2B:
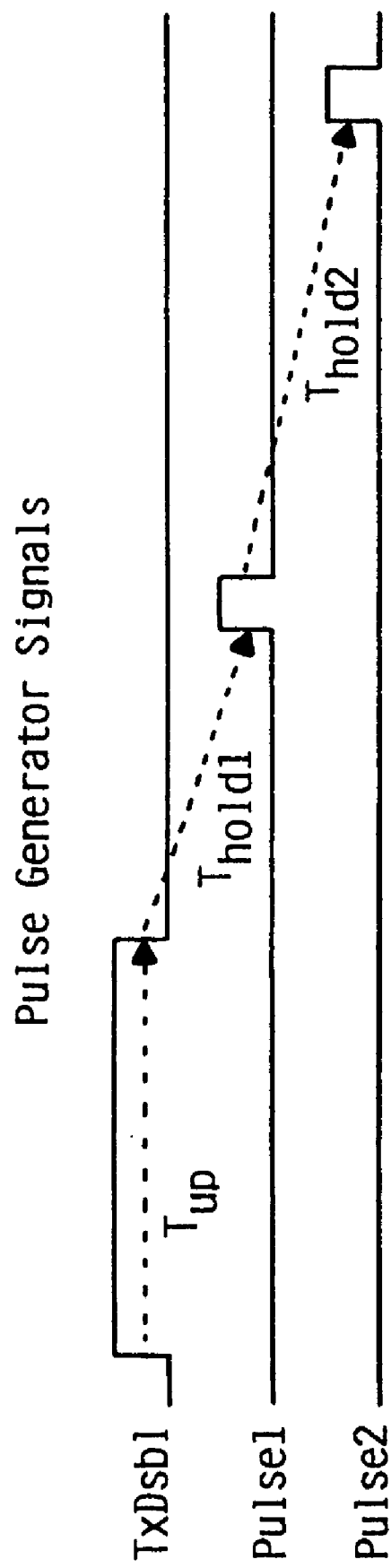
FIG. 2B illustrates the timing of signals from the pulse generator of FIG. 2A according to an exemplary embodiment of the invention.

The State Machine (108A/B) of FIG. 1 is shown in detail in FIG. 2A in block diagram form, according to an exemplary embodiment of the invention. FIG. 2B illustrates the timing of signals from the pulse generator 201 of FIG. 2A according to an exemplary embodiment of the invention.

The signal RxLOS-a/b from the Transceiver 105A/B provided to the State Machine 108A/B is processed by logic, D-Latch (L1) 202, inverter 203, AND gate (AND) 204, and Set/Reset-Latch (L2) 205 to provide an Enable signal to the enable (Enbl) input of the Pulse Generator 201. The RxLOS-a/b signal is produced by the Transceiver 105A/B when there is a signal which indicates a loss of reception. If an RxLOS is detected on either end of the link, one of the possibilities is that a new port will be plugged in and the data transmitted from that port might not be compatible with the receiver.

When enabled, the Pulse Generator 201 provides the TxDsbl signal to the Transceiver 105A/B, and output pulses (Pulse1 and Pulse2) to L1 202 and AND 204 to produce, from Set/Reset-Latch (L3) 206, the Negotiate signal to the Mux 107A/B. The TxDsbl signal is used to disable transmission, inducing an RxLOS on the opposite receiving end. If any event that might cause a change in port speed occurs, for example, fiber swapping, transceiver swapping, electrical switching of serial streams, the TxDsbl signal is cycled on and off for a long enough period of time to induce a RxLOS on the receiving end. RxLOS on the receiving end triggers the same cycling of TxDsbl on that end, so that both ends of the point-to-point link receive an RxLOS signal. (With respect to the Fiber Channel standard, the invention could be implemented in the physical layer with some buffering logic to control the RxLOS and TxDsbl.)

The TxDsbl is followed by the lowest frequency clock like data pattern that is desired to be transmitted by the systems. This way, the transceivers can default to their lowest bandwidth filtering and still be able to decipher the pattern. the problem of selecting the appropriate baud rate dependent filtering is solved by using a specific training pattern during events that could cause transceiver modules of different speed characteristics to be connected. Advantageously, this means that there is no additional pin required from an existing form factor device to signal the filtering bandwidth required for operation. The detection of the baud rate is done on the transceiver itself.

In the illustrated embodiment, the Negotiate signal selects the K28.7 input pattern which is used to negotiate and select a baud rate. In Fiber Channel, a K28.7 code, or binary 10 bit equivalent is 0011111000, is preferred. After the transceiver detects that a signal is present, it will start discriminating the baud rate.

FIG. 2B illustrates the timing of signals from the pulse generator 201 of FIG. 2A according to an exemplary embodiment of the invention. It is noted that the time 'T-up' should be greater than the minimum pulse width for TxDsbl on the transceivers. The time 'T-hold1' should be greater than two times the delay on the fiber plus the RxLOS response time plus the TxDsbl response time. The time 'T-hold2' should be greater than the lock on time of the frequency discriminator (described below) in the transceiver.

Figure 3A:
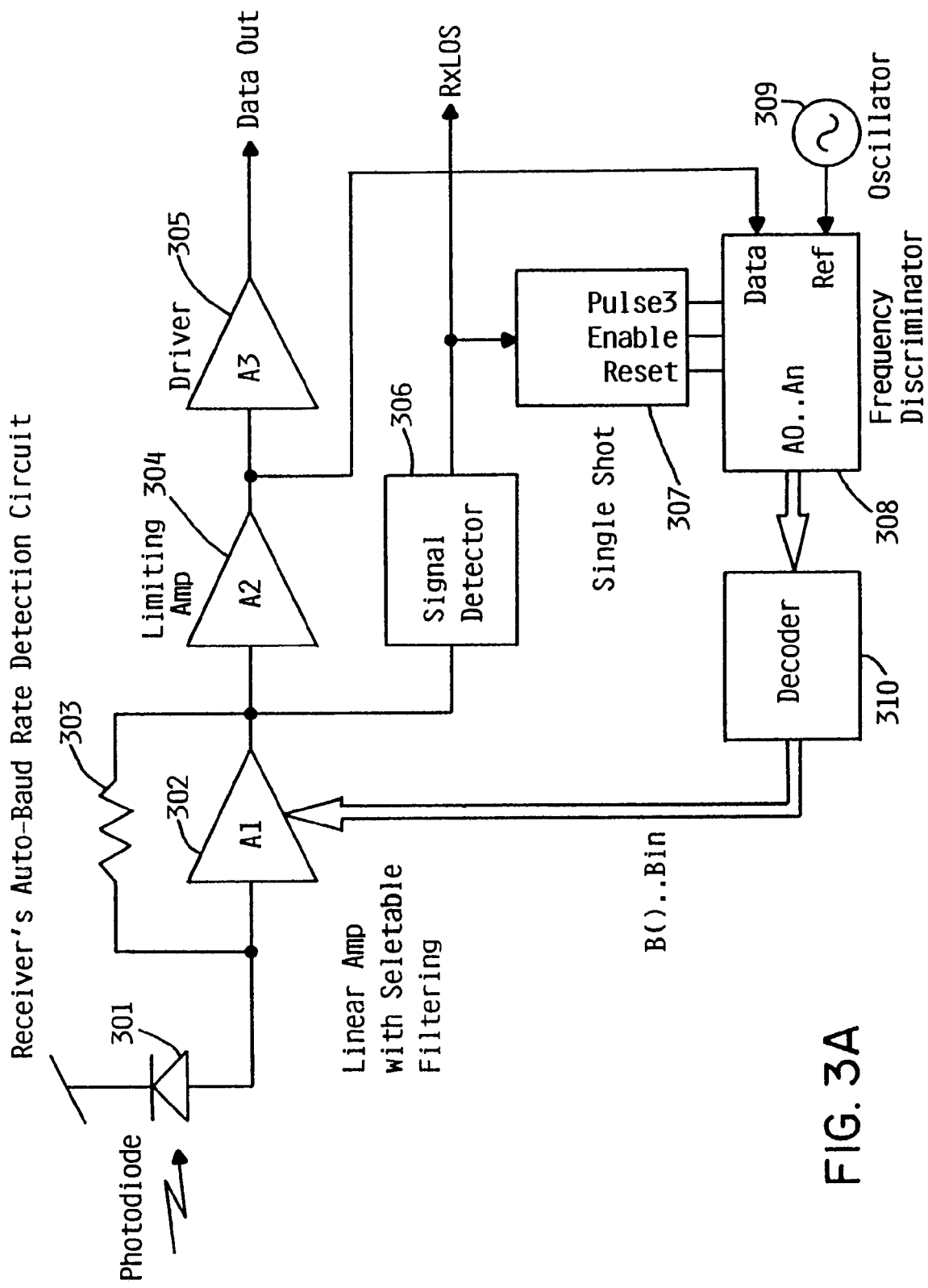
FIG. 3A illustrates a block diagram of a receiver auto-baud rate detection circuit according to an exemplary embodiment of the invention.

FIG. 3A illustrates a block diagram of a receiver auto-baud rate detection circuit, according to an exemplary embodiment of the invention. Integrating the auto-baud rate detection circuit of FIG. 3A with the other block diagrams of the exemplary embodiment, it would, for example, be located in the transceiver block 105A/B of FIG. 1.

Optical communications signals are received and converted into electrical signals by a transducer, in particular, photodiode 301 in FIG. 3A. A first amplifier stage (A1) 302, having feedback represented by a resistance symbol 303 between the input and output of A1 302, receives the photodiode 301 output and provides an amplified output to a second amplifier stage (A2) 304. Preferably, A1 302 is a linear amplifier with selectable filtering. Different baud rate signal standards have different bandwidths, and these are selectable in stage A1 302.

The linear amplifier with selectable filtering A1 302 is followed by two further amplifier stages, namely a limiting amplifier stage (A2) 304, and a driver stage (A3) 305, in the illustrated embodiment. The driver stage A3 305 provides the received data output (Data Out) of the receiver.

The output of the first stage A1 302 is also provided to a Signal Detector block 306 which produces the RxLOS signal indicating a possible reconfiguration that might result in a baud rate mismatch between the receiver and a remote transmitter, as discussed earlier. The RxLOS signal is sent to the state machine block 108A/B shown in FIG. 1 to cause baud rate auto-negotiation to begin using, for example, a K28.7 code, as discussed earlier.

The RxLOS signal from the Signal Detector 306 is also provided to a Single Shot block 307 which is connected to a Frequency Discriminator block 308 on three output lines: Reset, Enable and Pulse3 lines.

The Frequency Discriminator block 308 also receives Data input from the output of the limiting amplifier stage A2 304, and a reference frequency from an Oscillator 309. The Frequency Discriminator block 308 outputs a signal which indicates the frequency of the received communication signal. This frequency indicating signal may be multi-bit, the number of bits depending on the number of possible communication frequencies of the transceiver, and these bits are then decoded by Decoder block 310. Decoder block 310 provides an output to the Linear Amplifier with Selectable Filtering A1 302 which selects the appropriate filtering for the frequency detected.

Figure 3B:
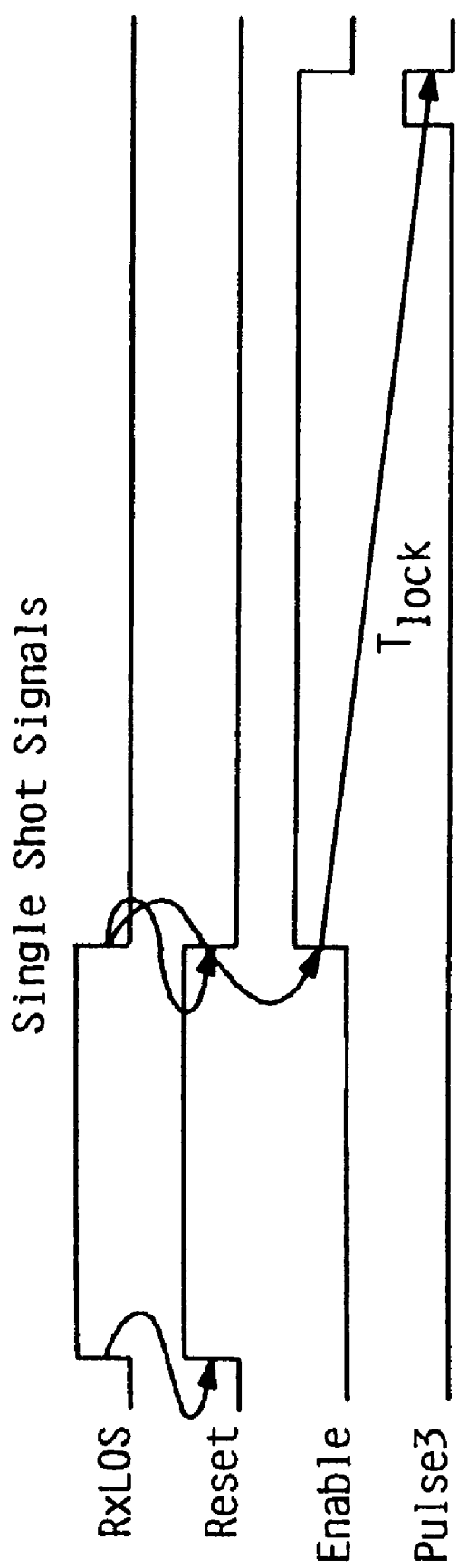
FIG. 3B illustrates the timing of signals of the single shot block in the receiver auto-baud rate detection circuit of FIG. 3A according to an exemplary embodiment of the invention.

FIG. 3B illustrates the timing of signals from the Single Shot block 307 in the Receiver's Auto-Baud Rate Detection Circuit of FIG. 3A, according to an exemplary embodiment of the invention.

When Reset is true, the Frequency Discriminator 308 will default to a code which decodes into the lowest bandwidth setting for the Selectable Filter. This setting still passes the K28.7 pattern of high baud rate signals through since K28.7 is a low frequency pattern.

The time for the Frequency Discriminator 308 to lock on (when the Enable signal is true) is 'T-lock' as shown. During this time, the Frequency Discriminator 308 detects the baud rate of the Data being input using the reference oscillator signal from Oscillator 309. The time 'T-lock' should be greater than the maximum time it takes for the Frequency Discriminator 308 to lock on to the baud rate of the Data input signal. This time must be less than 'T-hold2' from the negotiating timing shown in FIG. 2B.

The Pulse3 signal will latch the output of the Frequency Discriminator 308 after it is locked, and it will hold this state until the next RxLOS event.

Figure 4A:
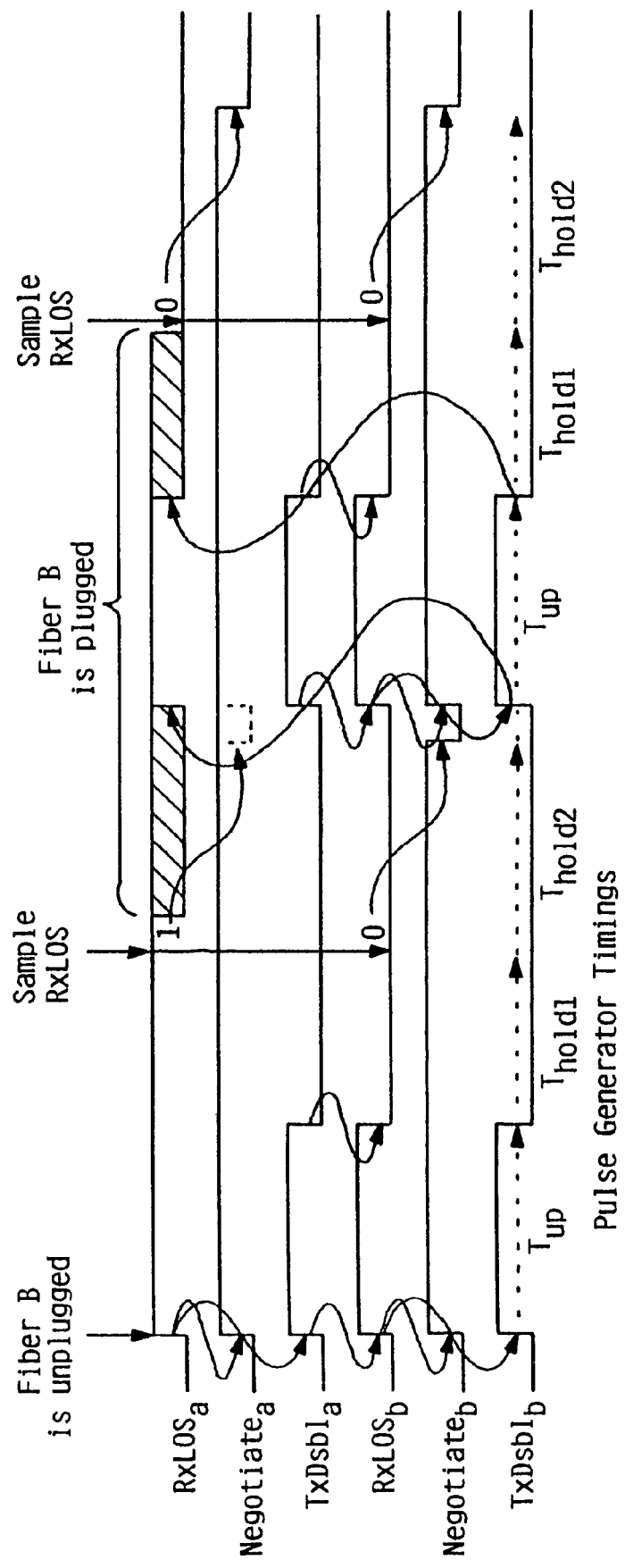
FIG. 4A illustrates the timing of signals for a single fiber disconnect/reconnect arrangement according to an exemplary embodiment of the invention.

FIG. 4A illustrates the timing of signals for a single fiber disconnect/reconnect arrangement according to an exemplary embodiment of the invention. Starting on the left-side of the diagram, one optical communications fiber, Fiber B, is unplugged resulting in RxLOS, Negotiate and TxDsbl signals to change state in System A which is followed by System B.

Figure 4B:
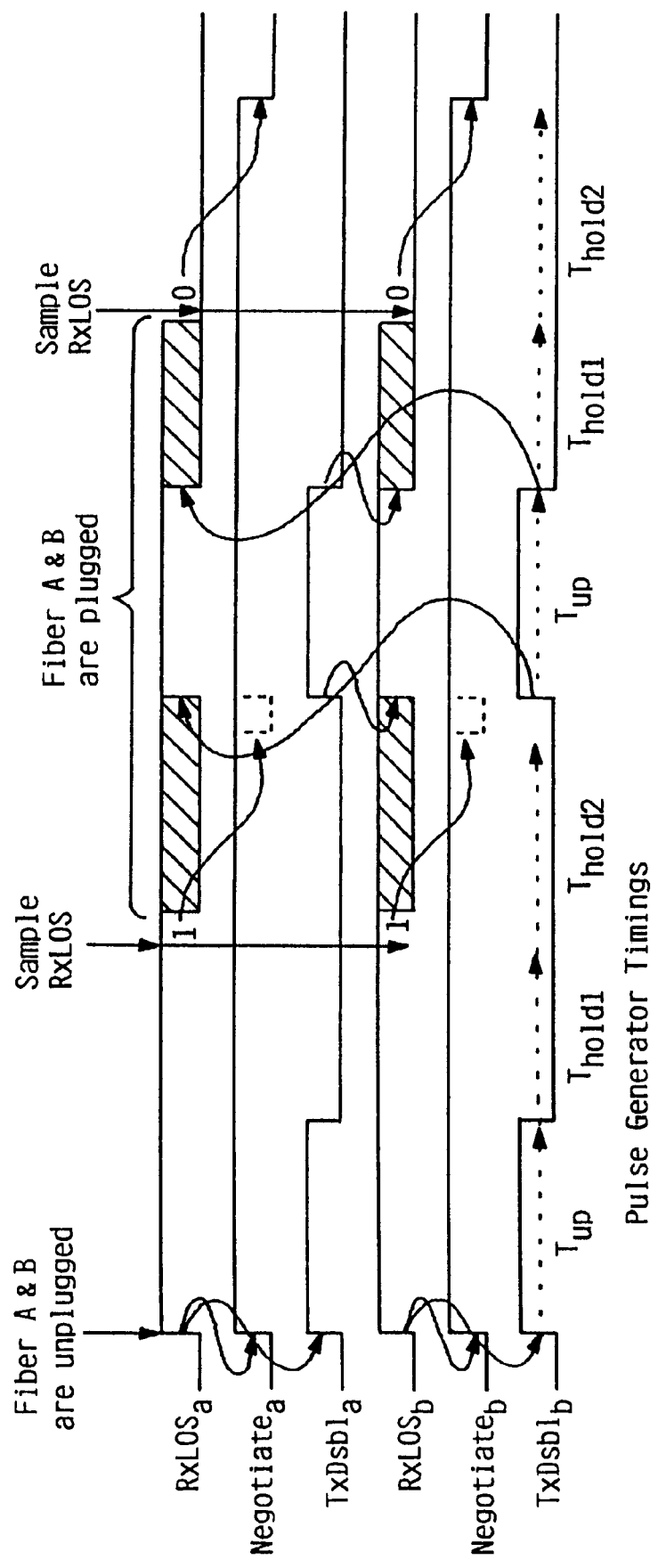
FIG. 4B illustrates the timing of signals for a duplex fiber disconnect/reconnect arrangement according to an exemplary embodiment of the invention.

FIG. 4B illustrates the timing of signals for a duplex fiber disconnect/reconnect arrangement according to an exemplary embodiment of the invention. Starting on the right-side of the diagram, optical communications fibers A&B are unplugged, resulting in RxLOS, Negotiate and TxDsbl signals to change state in both System A and System B (essentially simultaneously).

According to an exemplary embodiment of the invention, if an RxLOS is detected on either end of the link, one of the possibilities is that a new port has been plugged in and the data transmitted from that port might not be compatible with the receiver. Therefore, if any event that might cause a change in port speed occurs, for example, fiber swapping, transceiver swapping, electrical switching of serial streams, the TxDsbl input is cycled on and off for a long enough period of time to induce a RxLOS on the receiving end.

RxLOS on the receiving end triggers the same cycling of TxDsbl on that end, so that both ends of the point-to-point link receive an RxLOS signal. The TxDsbl is followed by the lowest frequency clock like data pattern that is desired to be transmitted by the system. This way, the transceivers can default to their lowest bandwidth filtering and still be able to decipher the pattern. In the Fiber Channel standard, a K28.7 code, or binary 10 bit equivalent is 0011111000, is preferred. After the transceiver detects that a signal is present, it will start discriminating the baud rate.

As was shown in FIG. 3A, an oscillator is provided on the transceiver, and a frequency discriminator (e.g., an up counter) is provided to count the number of transitions in a given oscillator period which is decoded into a baud rate by a decoder. The number of bits required in the frequency discriminator (e.g., up counter) is proportional to the number of transitions per oscillator period.

If the K28.7 pattern is used, this algorithm can be extended across a 5× change in baud rate since the lowest bandwidth receiver can still decipher the 0011111000 pattern if multiplied up by 5 to a 0101010101. As shown in FIG. 1, the K28.7 pattern is multiplexed with data in the Serializer/Transceiver, and, as shown in FIG. 2A, is selected with a Negotiate signal produced State Machine 108 by logical processing of RxLOS and pulse generator outputs.

With respect to Fiber Channel, this can be implemented in the physical layer with some buffering logic to control the RxLOS and TxDsbl.

At least some portions of the invention may be embodied as a computer program product. A computer program product includes a recording medium, such as a floppy disk, a high-capacity read only memory in the form of an optically read compact disc or CD-ROM, a tape, a transmission type media, such as a digital or analog communications link, or a similar computer program product.

It will be apparent to one skilled in the art that the manner of making and using the claimed invention has been adequately disclosed in the above-written description of the preferred embodiment(s) taken together with the drawings.

It will be understood that the above described preferred embodiment(s) of the present invention are susceptible to various modifications, changes, and adaptations, and the same are intended to be comprehended within the meaning and range of equivalents of the appended claims.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. An automatic baud rate detection circuit comprising:
   a signal detector which detects first predetermined signals at an input stage of a transceiver and responsive thereto, outputs second predetermined signals;
   a reference signal oscillator generator; and
   a frequency discriminator which receives a reference signal from the reference signal oscillator generator, and signals from the input stage of the transceiver, and outputs a baud rate signal in response to the second predetermined signals from the signal detector.

2. The circuit according to claim 1, wherein the input stage of the transceiver comprises:
   a photodetector which detects optical communications signals and outputs electrical signals
   a linear amplifier coupled to receive the electrical signals from the photodetector at an input and produce output signals at an output thereof; and
   a limiting amplifier which receives signals from the linear amplifier output at an input and produces output signals at an output thereof;
   wherein the signal detector receives the first predetermined signals from the output of the linear amplifier, and wherein the frequency discriminator receives signals from the output of the limiting amplifier.

3. The circuit according to claim 2, further comprising a decoder which decodes the baud rate signal from the frequency discriminator and produces a decoded output signal.

4. The circuit according to claim 3, wherein:
   the linear amplifier comprises a selectable filter; and
   the decoded output signal from the decoder is provided to the selectable filter to select a filter configuration appropriate for an associated baud rate.

5. A method of automatic baud rate negotiation comprising utilizing the automatic baud rate detection circuit according to claim 1.

6. A transceiver arrangement having a transceiver comprising the automatic baud rate detection circuit according to claim 1, the transceiver arrangement further comprising:
   a multiplexer which receives data at a first input and a predetermined digital pattern signal at a second input, and which output either the data or the digital pattern signal at an output depending on a negotiate control signal input signal;
   a serializer which receives the output from the multiplexer and provides a serialized output to the transceiver; and
   a state machine which outputs a first control signal to the transceiver, and outputs the negotiate control signal to the multiplexer to select the digital pattern signal, responsive to receiving a second control signal from the transceiver.

* * * * *